United States Patent
Vitt et al.

(10) Patent No.: US 9,410,469 B2
(45) Date of Patent: Aug. 9, 2016

(54) VALVE DEVICE FOR AN INTERNAL COMBUSTION ENGINE

(75) Inventors: Stefan Vitt, Grevenbroich (DE); Osman Sari, Grevenbroich (DE); Michael Wagner, Duesseldorf (DE); Bernd Homeyer, Edemissen (DE)

(73) Assignee: PIERBURG GMBH, Neuss (DE)

( * ) Notice: Subject to any disclaimer, the term of this patent is extended or adjusted under 35 U.S.C. 154(b) by 38 days.

(21) Appl. No.: 14/116,775

(22) PCT Filed: Apr. 27, 2012

(86) PCT No.: PCT/EP2012/057777
§ 371 (c)(1),
(2), (4) Date: Jan. 8, 2014

(87) PCT Pub. No.: WO2012/152601
PCT Pub. Date: Nov. 15, 2012

(65) Prior Publication Data
US 2014/0124691 A1    May 8, 2014

(30) Foreign Application Priority Data
May 11, 2011   (DE) .......................... 10 2011 050 263

(51) Int. Cl.
*F01N 13/08* (2010.01)
*F16K 11/044* (2006.01)
(Continued)

(52) U.S. Cl.
CPC ............... *F01N 13/08* (2013.01); *F02M 26/26* (2016.02); *F02M 26/50* (2016.02); *F02M 26/67* (2016.02); *F02M 26/74* (2016.02); *F16K 11/044* (2013.01);
(Continued)

(58) Field of Classification Search
CPC ............... F01N 13/08; F02M 25/0797; F02M 25/0789; F02M 25/0701; F02M 25/0792; F02M 26/50; F02M 26/67; F02M 26/26; F02M 26/74; F02M 26/69; F16K 11/044; Y10T 137/86815
USPC ....................... 137/625.4, 625.5, 625.48, 883; 123/568.18, 568.2
See application file for complete search history.

(56) References Cited

U.S. PATENT DOCUMENTS

| 849,532 A | 4/1907 | Coutant |
| 3,025,881 A * | 3/1962 | Freeman ..................... 137/627.5 |

(Continued)

FOREIGN PATENT DOCUMENTS

| CN | 101583788 A | 11/2009 |
| CN | 201679583 U | 12/2010 |

(Continued)

*Primary Examiner* — Michael R Reid
(74) *Attorney, Agent, or Firm* — Norman B. Thot

(57) ABSTRACT

A valve device for an internal combustion engine includes a housing with an inlet and an outlet, a passage opening which fluidically connects the inlet with the outlet, a first valve-closing member which controls the passage opening, an actuator, a valve rod on which the first valve-closing member is arranged, a stop element, a spring surrounding the valve rod, and an element. A first end of the spring is supported against the first valve-closing member, and a second end of the spring is supported against the stop element. The element substantially surrounds the spring. The element comprises a first lateral surface and a second lateral surface in mutual engagement with each other. The first lateral surface abuts against the first valve-closing member and is movable therewith. The second lateral surface abuts against the stop element. The first valve closing member moves relative to the stop element.

11 Claims, 1 Drawing Sheet

(51) Int. Cl.
*F02M 26/69* (2016.01)
*F02M 26/74* (2016.01)
*F02M 26/50* (2016.01)
*F02M 26/26* (2016.01)
*F02M 26/67* (2016.01)

(52) U.S. Cl.
CPC ......... *F02M 26/69* (2016.02); *Y10T 137/86815* (2015.04)

(56) References Cited

U.S. PATENT DOCUMENTS

| | | |
|---|---|---|
| 3,063,469 A | 11/1962 | Freeman |
| 4,017,913 A | 4/1977 | Judd |
| 2005/0274920 A1* | 12/2005 | Busato et al. ............ 123/568.23 |
| 2010/0313859 A1 | 12/2010 | Watanuki et al. |

FOREIGN PATENT DOCUMENTS

| | | |
|---|---|---|
| DE | 196 48 482 A1 | 5/1997 |
| DE | 197 33 964 A1 | 2/1999 |
| EP | 1 859 156 B1 | 8/2009 |
| JP | 8 200165 A | 8/1996 |
| JP | 9-144608 A | 6/1997 |
| JP | 10-54474 A | 2/1998 |
| JP | 10-103167 A | 4/1998 |
| JP | 11-200959 A | 7/1999 |
| JP | 11-287159 A | 10/1999 |
| JP | 2002-285918 A | 10/2002 |
| JP | 2009-243328 A | 10/2009 |
| JP | 2009-243329 A | 10/2009 |
| WO | WO 2006/092401 A1 | 9/2006 |

\* cited by examiner

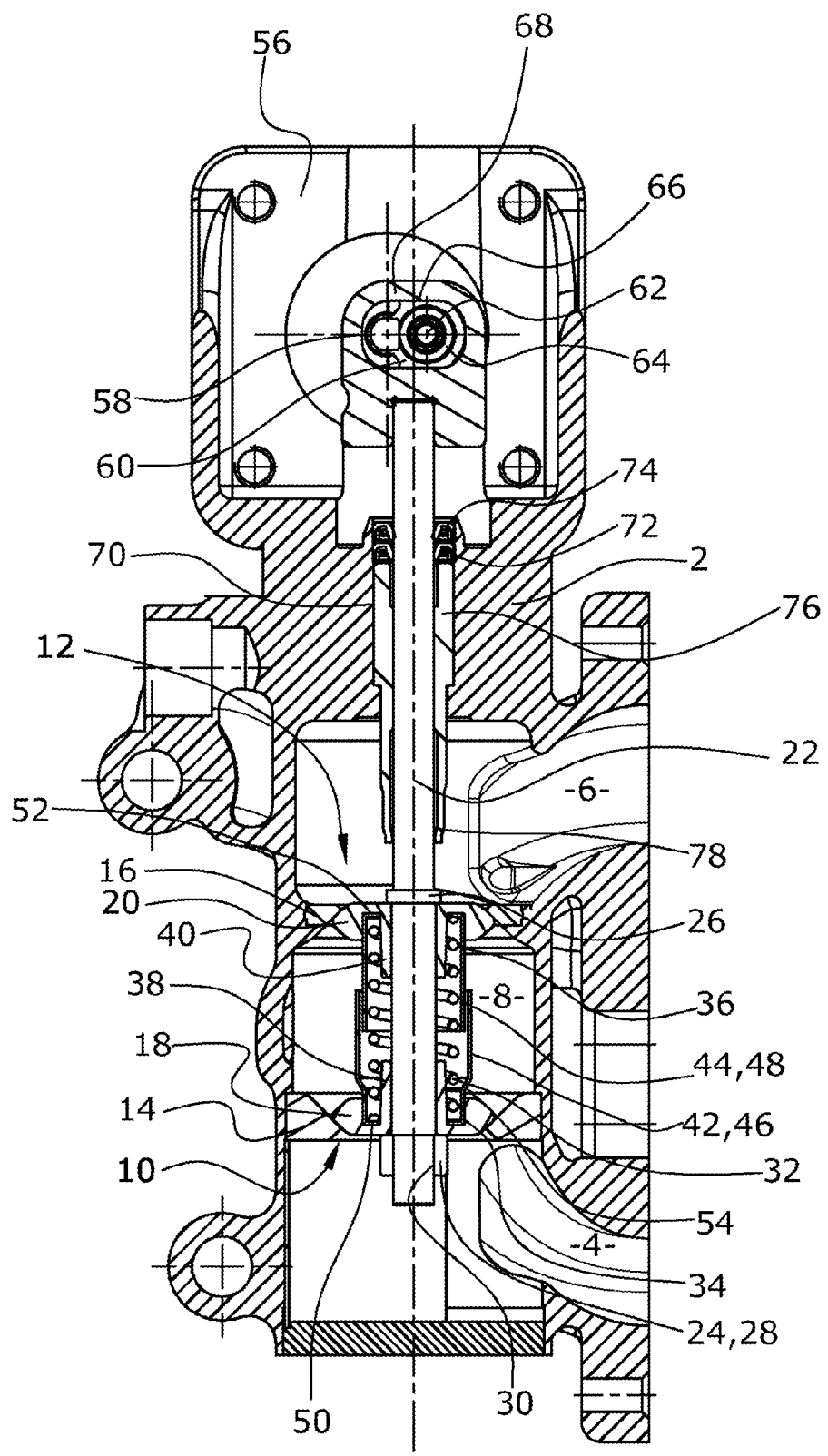

VALVE DEVICE FOR AN INTERNAL COMBUSTION ENGINE

CROSS REFERENCE TO PRIOR APPLICATIONS

This application is a U.S. National Phase application under 35 U.S.C. §371 of International Application No. PCT/EP2012/057777, filed on Apr. 27, 2012 and which claims benefit to German Patent Application No. 10 2011 050 263.7, filed on May 11, 2011. The International Application was published in German on Nov. 15, 2012 as WO 2012/152601 A1 under PCT Article 21(2).

FIELD

The present invention relates to a valve device for internal combustion engines which comprises a housing with at least one inlet and one outlet formed therein, at least one passage opening via which the at least one inlet can be fluidically connected to the at least one outlet, at least one valve-closing member by means of which the passage opening can be controlled, a valve rod which can be translationally moved by means of an actuator and on which the at least one valve-closing member is arranged, a spring that surrounds the valve rod and is supported with its first end against the at least one valve-closing member and with its opposite end against a stop element, and a protective element that substantially surrounds said spring.

BACKGROUND

Such valve devices are used, for example, for controlling a recirculated exhaust gas flow in an internal combustion engine for the purpose of reducing pollutants in the exhaust gas. The spring element provides that the valve-closing member is pressed on the corresponding valve seat. Depending on the installation site of the exhaust gas recirculation valve immediately behind the exhaust gas outlet of the cylinder or in the region of the intake pipe, in the low-pressure line or the high-pressure line, upstream or downstream of an exhaust gas cooler, the exhaust gas recirculation valve is exposed to different loads. A high thermal load, for example, exists in the immediate vicinity of the exhaust gas outlet of the cylinder, whereas a rather strong sooting tendency can be expected downstream of an exhaust gas cooler.

Two-way valves are also known via which a controlled exhaust gas flow can be directed selectively through an exhaust gas cooler or a bypass duct so that a valve situated downstream of the exhaust gas cooler is sometimes exposed to hot exhaust gas and sometimes to cold exhaust gas, depending on the exhaust gas recirculation line used.

A valve of this type is described, for example, in DE 197 33 964 A1. This valve is arranged downstream of an exhaust gas cooler or a bypass duct and comprises an actuator by which a valve rod can be displaced on which two valve-closing members are slidably arranged. A spring is disposed between the valve-closing members, by which the valve-closing members are biased against stops formed on the valve rod. Both valve-closing members are conical in shape and, in the non-actuated state, are caused by the spring pressure to contact corresponding valve seats. When the actuator is actuated, one of the valve-closing members, depending on the direction, is lifted from the valve seat by the stop against the spring force, whereas the other valve-closing member is still pressed against the valve seat by the spring force. It is thus possible to selectively control the flow-through section of the bypass duct or of the exhaust gas cooler outlet, depending on the direction of actuation. However, the spring disposed centrally in the flow-through region is exposed to high thermal loads and to occurring soiling.

EP 1 859 156 B1 describes a valve device wherein the spring of a correspondingly designed valve is surrounded by a compensation element in the form of a bellows, the axial ends of which are connected with the valve plates. This element is intended to generate a vacuum in the space enclosed thereby so that both valve plates can be lifted from their valve seats at the same time. The bellows may protect the spring and the valve rod area against soiling, however, it no longer functions under high thermal loads.

SUMMARY

An aspect of the present invention is to provide a valve device which operates without malfunction both under high thermal loads and in a sooty environment. Depositions on the valve rod, for example, in regions serving for slidable guiding, are to be avoided as are excessive thermal loads on the spring.

In an embodiment, the present invention provides a valve device for an internal combustion engine which includes a housing comprising at least one inlet and an outlet, at least one passage opening configured to fluidically connect the at least one inlet with the at least one outlet, a first valve-closing member configured to control the at least one passage opening, an actuator, a valve rod on which the first valve-closing member is arranged, a stop element, a spring surrounding the valve rod, and an element. The valve rod is configured so as to be translationally movable by the actuator. A first end of the spring is supported against the first valve-closing member, and a second end of the spring is supported against the stop element. The element is configured to substantially surround the spring. The element comprises a first lateral surface and a second lateral surface which are configured to be in mutual engagement with each other. The first lateral surface is arranged to abut against the first valve-closing member and is configured to be movable therewith. The second lateral surface is arranged to abut against the stop element. The first valve closing member is configured to move relative to the stop element. Owing to the fact that the element is substantially formed by two radially closed lateral surfaces in mutual engagement, the valve rod and the spring are shielded from the exhaust gas flow, with the first surface contacting the at least one valve-closing member and being movable together with the same, and the second surface contacting the stop element, while the valve-closing member is movable with respect to the stop element. A direct flow is omitted, resulting in thermal relief and reduced soiling.

BRIEF DESCRIPTION OF THE DRAWINGS

The present invention is described in greater detail below on the basis of embodiments and of the drawing in which:

FIG. 1 shows a side elevational view of a valve device of the present invention illustrated in section.

DETAILED DESCRIPTION

In an embodiment of the present invention, one of the interengaging radially closed lateral surfaces can, for example, be arranged in the other lateral surface, with the inner diameter of the one lateral surface being larger than the outer diameter of the other lateral surface. In this manner, a jamming of the two lateral surfaces is avoided. A good sealing effect is nevertheless achieved between the two protective elements, whereby the intrusion of dirt particles is significantly reduced.

In an embodiment of the present invention, the interengaging radially closed lateral surfaces can, for example, be formed by pot-shape components, the valve rod extending through the bottoms thereof. This facilitates the fastening of the protective elements.

In an embodiment of the present invention, the pot-shaped components are deep-drawn parts. These can be produced in a particularly economic manner.

In an embodiment of the present invention, the spring can, for example, press the bottoms of the pot-shaped components against the stop element on the first side and, on the opposite side, against the valve-closing member. The pot-shaped components can thus be maintained in their positions without establishing a material connection with the valve-closing element or having to use additional fastening means.

In an embodiment of the present invention, the valve-closing member can, for example, be disposed on the valve rod for translational movement and can, for example, be biased by the spring towards a stop connected with the valve rod. A secure seating of the valve-closing member on the valve seat can thereby be provided in the closed state.

In an embodiment of the present invention, the valve rod can, for example, have an end provided with an outer thread onto which a nut is threaded that serves as a stop. This screw allows the position of the valve-closing member on the valve rod to change so that the stop can be positioned in an optimal manner relative to the position of the valve seat.

In an embodiment of the present invention, a second valve-closing member can, for example, be arranged on the valve rod at a distance from the first valve-closing member, the second valve-closing member serving as a stop element for the spring and enabling the control of a second passage opening that leads to a second inlet or outlet. In this manner, a combined exhaust gas recirculation and bypass valve can be provided, whose passages can be controlled selectively.

Both valve-closing members can have recesses of a shape corresponding to that of the bottoms of the pot-shaped components and into which the pot-shaped components extend. A simple positioning and pre-fixation of the protective elements on the valve-closing members is thereby achieved during assembly. A tilting of the protective elements is reliably avoided.

Both valve-closing members can further be provided with annular protrusions extending into the interior of the spring, whereby a kinking of the spring is avoided. These protrusions form an elongated guiding portion.

In an embodiment of the present invention, both valve-closing members are arranged on the valve rod for translational movement and are biased by the spring between the two valve-closing members in respectively opposite directions towards stops formed on the valve rod on the side of the two valve-closing members opposite the spring. A selective control of the flow-through sections is thus achieved, with the respective closed duct being closed tightly. A relatively high tightness between the interior of the protective elements and the outer space is further provided. The valve-closing members are moreover biased towards their associated valve seats by the spring.

Such a valve device can be subjected to high thermal loads and can therefore be arranged just behind the exhaust gas outlet, since the heat is dissipated via the lateral surfaces. A particle-loaded environment does not limit functionality, since the valve rod, on which the valve-closing members have to slide, does not contact the loaded environment. A valve device is thus provided that has a long service life under adverse environmental influences.

An embodiment of the present invention is illustrated in the FIGURE and will be described hereinafter.

The present valve device comprises a housing 2 in which are formed two inlets 4, 6 and an outlet 8 arranged centrally between the inlets 4, 6. Two passage openings 10, 12 are formed in the housing 2 between the inlets 4, 6 and the outlet 8, via which passage openings 10, 12 a fluidic connection can be established from the inlets 4, 6 to the outlet 8.

These passage openings 10, 12 are delimited radially by a first valve seat 14 and a second valve seat 16 that cooperate with a first valve-closing member 18 and a second valve-closing member 20 to control the free flow-through section of the passage openings 10, 12.

The two valve closing-members 18, 20 are arranged on a valve rod 22 on which they can slide translationally. The distance of the possible sliding movement is limited by a first stop 24 for the first valve-closing member 18 and a second stop 26 for the second valve-closing member 20. The first stop 24 is formed in an adjustable manner by a nut 28 threaded onto an outer thread 30 at the end of the valve rod 22. Depending on how far the nut 28 is threaded onto the valve rod 22, the distance to the second stop 26 fixedly formed on the valve rod 22 can thereby be decreased or increased during assembly.

A spring 32 is mounted between the two valve-closing members 18, 20, the first end of the spring 32 pressing the first valve-closing member 18 against the nut 28 and the opposite second end of the spring 32 pressing the second valve-closing member 20 against the second stop 26. For the purpose of receiving the spring 32, the valve-closing members 18, 20 are each formed with a recess 34, 36 facing to the spring 32, the outer diameter of the recesses 34, 36 being slightly larger than the outer diameter of the spring 32. The valve-closing members 18, 20 are each further formed with an annular protrusion 38, 40 that surrounds the valve rod 22 and extends into the interior of the spring 32 and whose outer diameter is, correspondingly, slightly smaller than the inner diameter of the spring 32.

The valve-closing members 18, 20 comprise a section flaring towards the spring 32, by which they abut on the valve seat 14, 16 of a corresponding complementary shape. The distance between the two stops 24, 26 is then matched to the distance between the two valve seats 14, 16 such that, when the valve rod 22 is in its rest position, the spring 32 presses the valve-closing members 18, 20 against the valve seats 14, 16, with a small distance existing to the stops 24, 26.

According to the present invention, the spring 32 is surrounded by two pot-shaped parts 42, 44 manufactured as deep-drawn parts that serve as protective elements and whose lateral surfaces 46, 48 fully enclose the spring 32 in the radial direction. The bottoms 50, 52 of the pot-shaped parts 42, 44 have a hole at the center through which the valve rod 22 and the annular protrusions 38, 40 extend. The bottoms 50, 52 are seated in the respective associated recess 34, 36 of the valve-closing members 18, 20 so that the spring 32 does not rest directly on the respective valve-closing member 18, 20, but biases the respective bottom 50, 52 of the pot-shaped parts 42, 44 towards the valve-closing member 18, 20.

In the present embodiment, the recesses 34, 36 of the two valve-closing members 18, 20 have the same size. Immediately above the position at which the first pot-shaped part 42 protrudes from the recess 34, the same has an enlargement 54 from where the lateral surface 46 again extends in a hollow cylindrical shape towards the second pot-shaped part 44, but with a slightly larger diameter. The diameter of this end is selected such that its inner diameter is slightly larger than the outer diameter of the second pot-shaped part 44. This means the second pot-shaped 44 can be pushed into the first pot-shaped part 42. Care should be taken that, on the one hand, jamming is also avoided in case of axial misalignment and, on the other hand, a sealing effect is achieved.

The valve rod 22 is driven in a manner known per se by an electromotive actuator 56 having its output shaft 58 provided with an eccentric 60 whose output journal 62 has a ball bearing 64 fixed thereto that moves in a link plate 66 of a coupling element 68 to which the valve rod 22 is fastened.

The valve rod 22 extends through a bore 70 in the housing 2, wherein sealing rings 72, 74 arranged one above the other are disposed in the bore 70 in a manner surrounding the valve rod 22, the sealing rings resting on a shield element 76 that extends from the bore 70, which takes the shape of a stepped bore, into the region of the first inlet 4 in a manner surrounding the valve rod 22. This shield element 76 serves to guide the valve rod 22 and also has a constriction 78 at its end by which the flow resistance along the valve rod is increased so that a flow along the valve rod is significantly reduced. The inner diameter of this constriction 78 is, for example, about 0.5 mm larger than the outer diameter of the valve rod 22.

When the actuator 56 is rotated clockwise from the position illustrated in FIG. 1, the ball bearing 64 presses the coupling element 68 and thereby the valve rod 22 downward. As a consequence, the second stop 26 presses against the second valve-closing member 20 and the same is lifted from the valve seat 16 against the spring force. Cooled exhaust gas can thus, for example, flow from the inlet 4 into the outlet 8.

As the valve-closing member 20 is lifted, the second valve-closing member 18 remains on the valve seat 14, since it cannot escape downward, so that the size of the passage opening 10 that can be flown through can be controlled freely. For the valve-closing member 18 to remain in this position, it is arranged in a slidably movable manner on the valve rod 22, i.e., the valve rod 22 slides through the hole in the valve-closing member 18 as it moves.

Lifting the valve-closing ember 20 further causes a reduction of the mutual distance between the two valve-closing members 18, 20 so that the spring 32 is compressed. During this compression, the second pot-shaped part 44 slides into the first pot-shaped part 42 so that the spring 32 remains fully enclosed in any position. The hot exhaust gas flow thus does not make direct contact with the spring 32. Instead, the heat can at least partly be dissipated to the housing 2 via the protective elements 42, 44 and the valve-closing members 18, 20. Further, dirt particles do not reach the vicinity of the spring or the region, where the valve-closing members 18, 20 slide on the valve rod 22.

When the actuator 56 is rotated in the opposite direction again, the valve-closing member 20 returns to its valve seat 16, with the spring 32 being relaxed and the overlap between the two pot-shaped parts 42, 44 being reduced again, until the initial position is finally reached.

By rotating the actuator 56 further, the valve rod is moved upward towards the actuator 56, whereby the nut 28 lifts the valve-closing member 18 from the first valve seat 14, while the spring 32 still presses the second valve-closing member 20 on its valve seat 16 and the valve rod 22 slides upward through the hole in the second valve-closing member. In the same manner as described before, the spring 32 is compressed again. The first passage opening 10 is thus controlled, via which, for example, a fluidic connection is established from a bypass duct, bypassing the exhaust gas cooler, via the first inlet 4 to the outlet 8.

The spring 32 and the sliding region of the valve rod 22 are again shielded against the thermal load and the dirt particle load caused by the exhaust gas flow. Less expensive spring raw materials can therefore be used. It is further avoided that the valve-closing members become stuck on the valve rod 22. A valve device is thus provided that can be manufactured at low cost, has a long service life, and high functionality.

It should be clear that the scope of protection of the application is not limited to the embodiment described above. For example, the arrangement of the two protective elements is also useful in valve devices having only one valve-closing member. In this case, the upper element is moved firmly against a stop element which in the present embodiment is the second valve-closing member. The function would then be restricted to the above-described function of the first valve-closing member, the spring serving as a return element. Other structural modifications are also conceivable. Reference should also be had to the appended claims.

What is claimed is:

1. A valve device for an internal combustion engine, the valve device comprising:
   a housing comprising at least one inlet and an outlet;
   at least one passage opening configured to fluidically connect the at least one inlet with the at least one outlet;
   a first valve-closing member configured to control the at least one passage opening;
   an actuator;
   a valve rod on which the first valve-closing member is arranged, the valve rod being configured so as to be translationally movable by the actuator;
   a stop element;
   a spring surrounding the valve rod, a first end of the spring being supported against the first valve-closing member, and a second end of the spring being supported against the stop element;
   an element configured to substantially surround the spring, the element comprising a first lateral surface and a second lateral surface which are configured to be in mutual engagement with each other and to slide with respect to each other, the first lateral surface being arranged to abut against the first valve-closing member and being configured to be movable therewith, and the second lateral surface being arranged to abut against the stop element, the first valve closing member being configured to move relative to the stop element;
   a first pot-shaped part consisting of a first bottom and the first lateral surface formed integrally therewith; and
   a second pot-shaped part consisting of a second bottom and the second lateral surface formed integrally therewith,
   wherein,
   the first bottom and the second bottom each have the valve rod extend therethrough, and
   the spring presses the first bottom against the first valve-closing member and the second bottom against the stop element.

2. The valve device as recited in claim 1, wherein the first lateral surface comprises an inner diameter, and the second lateral surface comprises an outer diameter, the inner diameter of the first lateral surface being larger than the outer diameter of the second lateral surface, the second lateral surface being arranged inside the first lateral surface so as to inter-engage therewith.

3. The valve device as recited in claim 1, wherein the first pot-shaped part and the second pot-shaped part are each a deep-drawn part.

4. The valve device as recited in claim 1, further comprising a first stop connected with the valve rod, wherein the first valve-closing member is disposed on the valve rod for a translational movement and is biased by the spring towards the first stop.

5. The valve device as recited in claim 4, further comprising a nut, wherein the valve rod comprises an end with an outer thread configured to have the nut be screwed thereon so as to serve as the first stop.

6. The valve device as recited in claim 1, wherein the at least one inlet comprises a first inlet and a second inlet, the at least one passage opening comprises a first passage opening and a second passage opening, and further comprising a second valve-closing member arranged on the valve rod at a distance from the first valve-closing member, the second valve-closing member being configured as the stop element for the spring and being configured to control the second passage opening leading to the second inlet or the outlet.

7. The valve device as recited in claim 6, wherein the first valve-closing member comprises a first recess, and the second valve closing member comprises a second recess, the first recess having a shape which corresponds to a shape of the second bottom of the second pot-shaped part and into which the second pot-shaped part extends, the second recess having a shape which corresponds to a shape of the first bottom of the first pot-shaped part and into which the first pot-shaped part extends.

8. The valve device as recited in claim 6, wherein the spring comprises an interior, and each of the first valve-closing member and the second valve closing member comprise annular protrusions which extend into the interior of the spring.

9. The valve device as recited in claim 6, further comprising a second stop formed on the valve rod, wherein each of the first valve-closing member and the second valve closing member are arranged on the valve rod so as to be translationally movable, the first valve closing member being biased by the spring towards the first stop on a side of the first valve-closing member opposite the spring, and the second valve closing member being biased by the spring in an opposite direction towards the second stop on a side of the second valve-closing member opposite the spring.

10. The valve device as recited in claim 6, further comprising a first valve seat and a second valve seat, wherein the first valve-closing member is biased by the spring towards the first valve seat, and the second valve closing member is biased by the spring towards the second valve seat.

11. The valve device as recited in claim 1, wherein the spring comprises a first and a second end, the first end of the spring being configured to directly press against the first bottom of the first pot-shaped part, and the second end of the spring being configured to directly press against the second bottom of the second pot-shaped part.

\* \* \* \* \*